(12) United States Patent
Fulton et al.

(10) Patent No.: US 10,953,499 B2
(45) Date of Patent: *Mar. 23, 2021

(54) BRAKE SYSTEM COMPONENT AXLE MOUNT

(75) Inventors: R. Scott Fulton, Hudson, OH (US); Andrew J. Westnedge, Bolingbrook, IL (US); Dmitriy E. Rubalskiy, Glenview, IL (US); Michael J. Keeler, Naperville, IL (US); Phillippi R. Pierce, Canton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/249,420

(22) Filed: Sep. 30, 2011

(65) Prior Publication Data

US 2012/0080573 A1 Apr. 5, 2012

Related U.S. Application Data

(60) Provisional application No. 61/388,285, filed on Sep. 30, 2010.

(51) Int. Cl.
*F16D 65/00* (2006.01)
*B23P 11/00* (2006.01)
(Continued)

(52) U.S. Cl.
CPC ............... *B23P 11/00* (2013.01); *B60T 1/067* (2013.01); *F16D 65/28* (2013.01);
(Continued)

(58) Field of Classification Search
CPC ............... F16D 2051/003; F16D 65/00; F16D 65/0056; F16D 65/02; F16D 2250/00; F16D 2250/0084; F16D 2250/0061; F16D 2300/12
USPC ................. 188/218 R; 267/52; 280/124.116, 280/124.156, 124.175; 301/124.1, 132, 301/134, 135, 137; 248/205.1
See application file for complete search history.

(56) References Cited

U.S. PATENT DOCUMENTS 1,703,037 A * 2/1929 Heck .............................. 228/136
1,906,290 A * 5/1933 Urschel ........................... 267/52
(Continued)

FOREIGN PATENT DOCUMENTS

EP 1334848 B1 1/2003
WO 1987005369 A1 9/1987
(Continued)

*Primary Examiner* — Melody M Burch
(74) *Attorney, Agent, or Firm* — Dureska & Moore, LLC; David P. Dureska; Brent L. Moore

(57) ABSTRACT

A brake system component axle mount for a vehicle axle/suspension system includes an axle having at least one depression formed therein. A sleeve is formed with at least one depression and disposed about the axle so that the axle depression and the sleeve depression matingly engage one another to form a mated pair of depressions. A brake mount assembly is rigidly attached to the sleeve. A method of forming the brake system component axle mount includes providing an axle and disposing a sleeve about the axle. At least one mated pair of depressions is simultaneously formed in the axle and the sleeve. A brake mount assembly is rigidly attached to the sleeve.

11 Claims, 13 Drawing Sheets

(51) Int. Cl.
    *B60T 1/06*    (2006.01)
    *F16D 65/28*    (2006.01)
    *F16D 125/64*    (2012.01)
    *F16D 125/56*    (2012.01)
    *F16D 55/00*    (2006.01)

(52) U.S. Cl.
    CPC .. *B23P 2700/14* (2013.01); *F16D 2055/0008* (2013.01); *F16D 2125/56* (2013.01); *F16D 2125/64* (2013.01); *Y10T 29/49826* (2015.01)

(56) References Cited

U.S. PATENT DOCUMENTS

| | | | |
|---|---|---|---|
| 4,575,145 | A | 3/1986 | Wolfram et al. |
| 6,015,350 | A * | 1/2000 | Breese .................. 464/162 |
| 6,059,378 | A | 5/2000 | Dougherty et al. |
| 6,240,806 | B1 * | 6/2001 | Morris ................ B60T 1/067 188/205 R |
| 6,241,266 | B1 | 6/2001 | Smith et al. |
| 6,340,080 | B1 * | 1/2002 | Carlson ............. A63B 21/0056 188/267 |
| 7,007,960 | B2 | 3/2006 | Chalin et al. |
| 7,066,479 | B2 * | 6/2006 | Melton ................. 280/124.11 |
| 7,066,491 | B2 * | 6/2006 | Kittier et al. ............. 280/777 |
| 8,454,040 | B2 * | 6/2013 | Westnedge et al. ... 280/124.116 |
| 9,656,208 | B2 * | 5/2017 | Kruse ................. B01D 53/94 |
| 2003/0024095 | A1 * | 2/2003 | Spielmannleitner ........ 29/421.1 |
| 2009/0224503 | A1 | 9/2009 | Richardson |

FOREIGN PATENT DOCUMENTS

| | | | |
|---|---|---|---|
| WO | 2009014423 | A1 | 1/2009 |
| WO | 2009035520 | A1 | 3/2009 |

\* cited by examiner

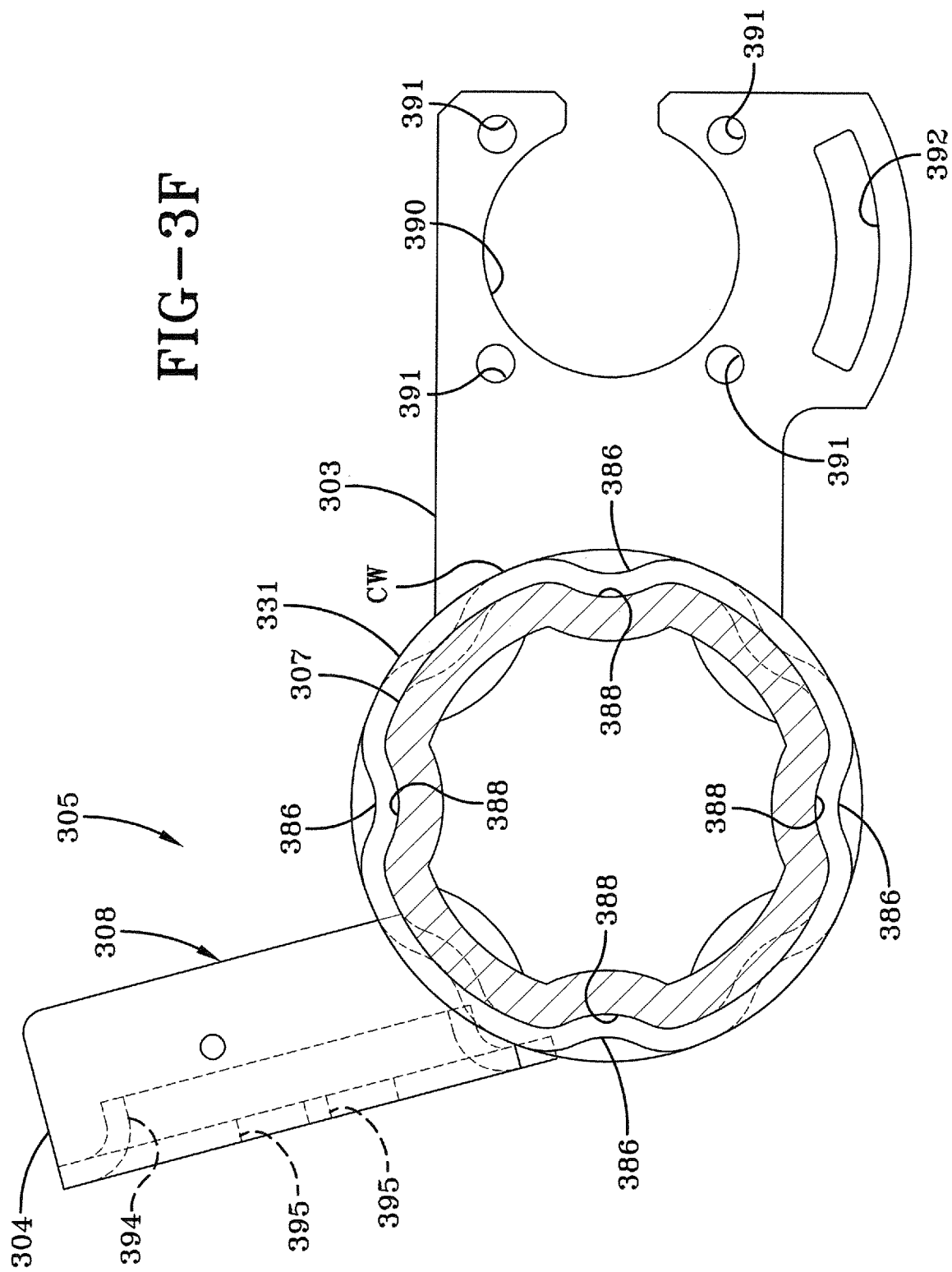

BRAKE SYSTEM COMPONENT AXLE MOUNT

CROSS-REFERENCE TO RELATED APPLICATION

This application claims the benefit of U.S. Provisional Patent Application Ser. No. 61/388,285, filed Sep. 30, 2010.

BACKGROUND OF THE INVENTION

Field of the Invention

The invention relates generally to brake systems for wheeled vehicles. More particularly, the invention is directed to the brake component mounting brackets that are attached to or adjacent to the axle of the vehicle. More specifically, the invention is directed to a heavy-duty brake system component axle mount for trucks and tractor-trailers, in which the mounting brackets for the brake system components are securely and efficiently connected to the axle by a brake bracket mounting sleeve. The sleeve and axle structure, together with the manner in which the brake system component axle mount connections are made and assembled, eliminates welds between the mounting brackets and the axle. Elimination of these welds in turn eliminates stress risers and local mechanical property changes in the axle caused by such welds, and thereby increases durability of the axle and the brake component mount-to-axle connection.

Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. For the purpose of convenience and clarity, reference herein will be made to beams, with the understanding that such reference is by way of example, and that the present invention applies to heavy-duty vehicle air-ride axle/suspension systems that utilize rigid-type beams or spring-type beams and also to heavy-duty vehicle mechanical axle/suspension systems. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger, which in turn is attached to and depends from a respective one of the main members of the vehicle. The beams of the axle/suspension system can either be an overslung/top-mount configuration or an underslung/bottom-mount configuration. For the purposes of convenience and clarity hereinafter, a beam having an overslung/top-mount configuration shall be referred to as an overslung beam with the understanding that such reference is by way of example, and that the present invention applies to both overslung/top-mount configurations and underslung/bottom-mount configurations. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the main members. A height control valve is mounted on the hanger and is operatively connected to the beam in order to maintain the ride height of the vehicle. The beam may extend rearwardly or frontwardly from the pivotal connection relative to the front of the vehicle, thus defining what are typically referred to as trailing or leading arm axle/suspension systems, respectively. However, for purposes of the description contained herein, it is understood that the term "trailing arm" will encompass beams, which extend either rearwardly or frontwardly with respect to the front end of the vehicle. One or more shock absorbers and a brake assembly also are mounted on the axle/suspension system.

Conventional heavy-duty vehicle brake systems typically include a brake assembly for each suspension assembly and its associated wheel. The brake assembly components typically include a brake chamber, a piston, a slack adjuster, and an S-cam assembly. The S-cam assembly includes a cam shaft and an S-cam which is utilized to move brake shoes against a brake drum of the vehicle wheel to decelerate the vehicle. The cam shaft typically is supported at each of its ends. More particularly, the outboard end of the cam shaft is supported by a brake spider which in turn is mounted on the axle. The inboard end of the cam shaft is supported by a cam shaft bracket. The brake spider and the cam shaft bracket each support a bearing to enable rotation of the cam shaft during operation of the vehicle. The cam shaft bracket is typically welded directly to the axle and provides stability to the inboard end of the cam shaft and its bearing, and in turn to the entire brake assembly. The brake chamber is also mounted on the axle via a brake chamber bracket, which also typically is welded directly to the axle.

More specifically, the welding of the brake chamber bracket and the cam shaft bracket directly to the axle can potentially create significant stress risers and local mechanical property changes in the axle, as is generally well known in the art. These stress risers and local mechanical property changes in the axle can in turn potentially reduce the life expectancy of the axle.

The brake system component axle mount of the present invention overcomes the aforementioned potential problems associated with axle/suspension systems that utilize prior art brake chamber brackets and cam shaft brackets, by eliminating all of the welds between the brackets and the axle and thereby producing a mechanical lock at the brake component mount-to-axle connection of the axle/suspension system. The elimination of the welds between the brake assembly brackets and the axle eliminates both stress risers and local mechanical property changes in the axle caused by the welds, thereby improving the life and durability of the axle and the brake component mount-to-axle connection.

SUMMARY OF THE INVENTION

Objectives of the present invention include providing a brake system component axle mount that eliminates all of the welds between the mount and the axle of the axle/suspension system.

Yet another objective of the present invention is to provide a brake system component axle mount that improves the life and durability of the brake mount connection.

These objectives and advantages are obtained by the brake system component axle mount for an axle/suspension system including an axle formed with at least one depression; a sleeve formed with at least one depression, the sleeve disposed about the axle, the at least one axle depression matingly engaging said at least one sleeve depression to form a mated pair of depressions for attaching the sleeve to the axle, and a mount assembly rigidly attached to the sleeve for mounting a brake assembly of the axle/suspension system.

These objectives and advantages are also obtained by the method of forming a brake system component axle mount for an axle/suspension system including the steps of: a) providing an axle; b) disposing a sleeve about the axle; c) simultaneously forming at least one mated pair of depressions in the sleeve and the axle to attach the sleeve to the axle; and d) rigidly attaching a mount assembly to the sleeve for mounting a brake assembly of the axle/suspension system.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 3F is a sectional view of the axle and the sleeve of one of the brake system component axle mounts shown in FIG. 3E, and showing the depressions formed in the sleeve and the axle. Similar numerals refer to similar parts throughout the drawings.

DESCRIPTION OF THE PREFERRED EMBODIMENT

Figure 1:
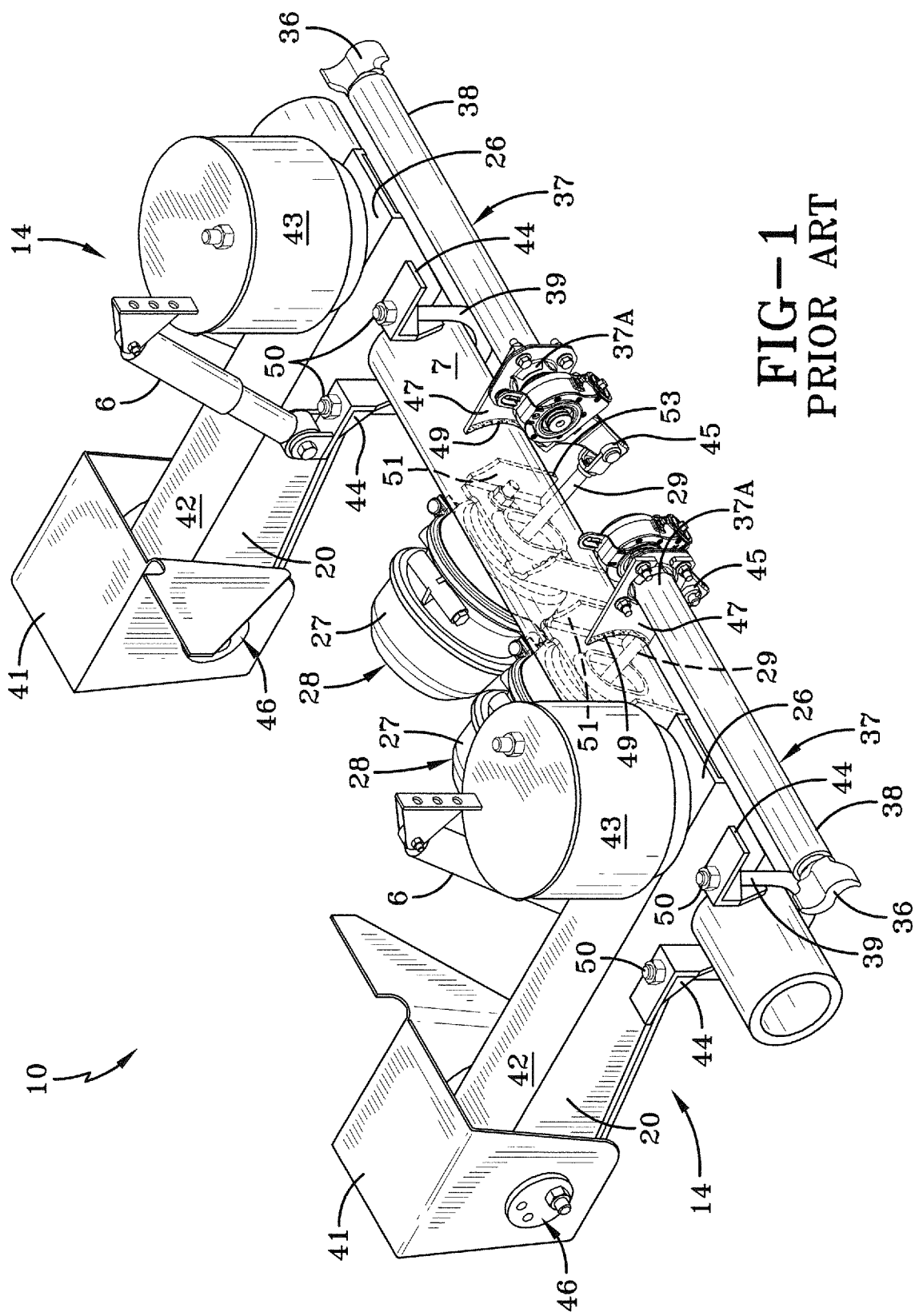
FIG. 1 is a driver side rear perspective view of an axle/suspension system utilizing prior art brake chamber brackets and cam shaft brackets welded directly to the axle, with hidden portions represented by broken lines.

A prior art trailing arm overslung beam-type air-ride axle/suspension system for heavy-duty vehicles is indicated generally at 10, is shown in FIG. 1, and now will be described.

Because axle/suspension system 10 includes a pair of suspension assemblies 14 that generally mirror one another, for sake of clarity only one of the suspension assemblies will be described below.

Suspension assembly 14 is pivotally connected to a hanger 41 via a trailing arm overslung beam 42. More specifically, trailing arm beam 42 includes a front end 20 having a bushing assembly 46, which includes a bushing, pivot bolts and washers, as are well known in the art, to facilitate pivotal connection of the beam to hanger 41. Beam 42 also includes a rear end 26, which is rigidly attached to a transversely-extending axle 7 via a pair of U-bolts 39 (only one shown) that are disposed around the axle and fastened, via nuts 50, to U-bolt brackets 44, which in turn are mounted on beam 42.

Suspension assembly 14 also includes an air spring 43 mounted on and extending between rear end 26 of beam 42 and a main member (not shown). A shock absorber 6 is mounted between beam 42 and the main member (not shown) in a manner well known in the art. For the sake of relative completeness, a brake assembly 28 is shown mounted on prior art suspension assembly 14.

More particularly, brake assembly 28 includes a brake chamber 27, a piston 29, a slack adjuster 45, and an S-cam assembly 37. S-cam assembly 37 includes an S-cam 36 attached to the outboard end of a transversely extending cam shaft 38. Cam shaft 38 is supported at each of its ends. More particularly, the outboard end of cam shaft 38 is supported by a brake spider and a bearing (not shown). The inboard end of cam shaft 38 is supported by a cam shaft bracket 47 having a bearing 37A mounted thereon. Cam shaft 38 thus is rotatably mounted in the brake spider bearing and the cam shaft bracket bearing 37A, for moving brake shoes (not shown) against a brake drum of the respective vehicle wheel (not shown) to decelerate the vehicle during operation. Cam shaft bracket 47 is attached directly to axle 7 via welds 49 and provides stability to the inboard end of S-cam assembly 37, which in turn provides stability to brake assembly 28. Brake chamber 27 is mounted on axle 7 via a brake chamber bracket 51, which is similarly welded directly to the axle via welds 53.

The welding of brake chamber bracket 51 and cam shaft bracket 47 directly to axle 7 can potentially create significant stress risers and local mechanical property changes in the axle, as is generally well known in the art. These stress risers and local mechanical property changes in axle 7 can in turn potentially reduce the life expectancy and durability of the axle. These potential issues are solved by the brake system component axle mount of the present invention, which is described in detail below.

Figure 2A:
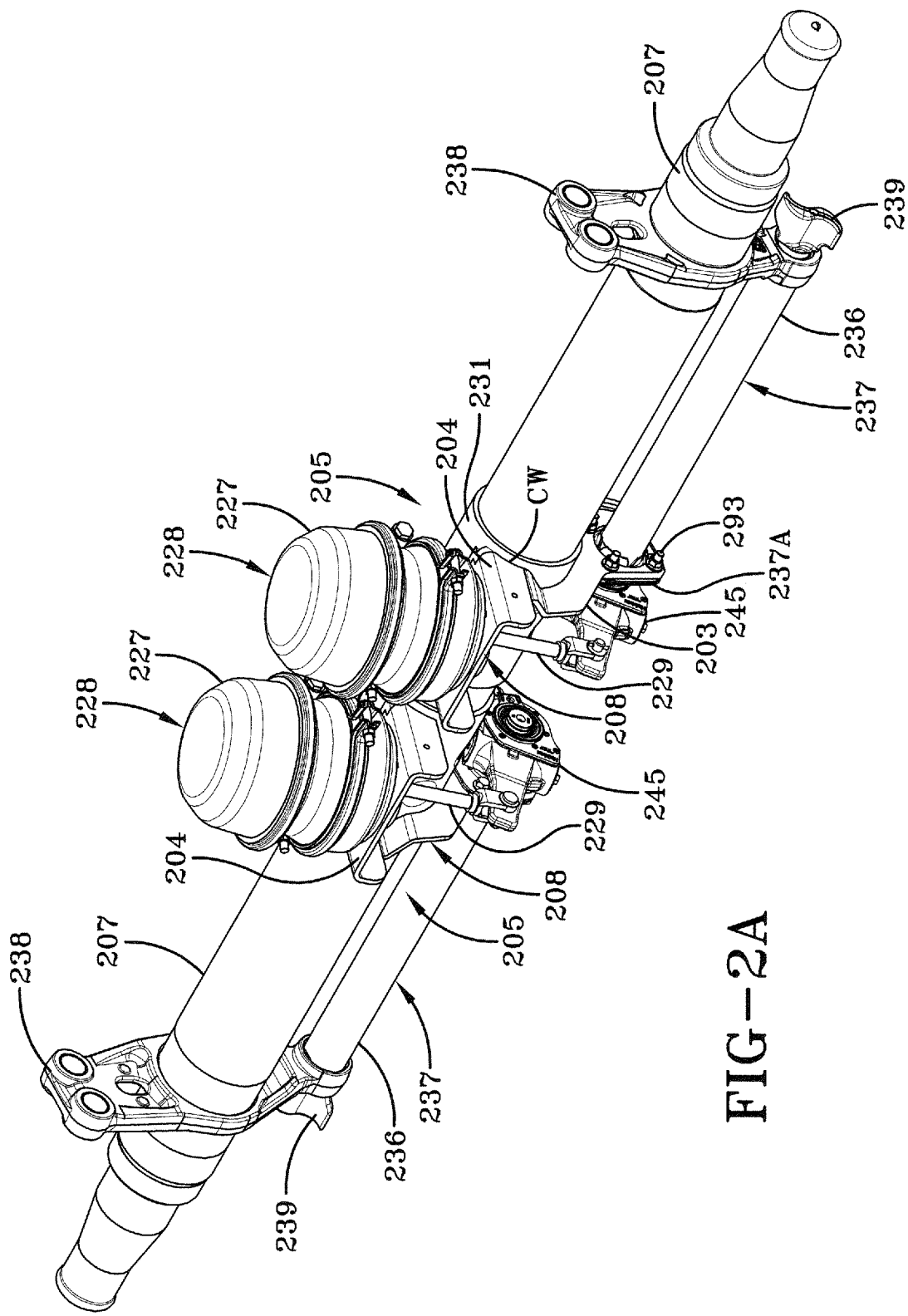
FIG. 2A is a bottom perspective view of an axle and a pair of brake assemblies, each of the brake assemblies shown mounted on the axle by a first preferred embodiment brake system component axle mount of the present invention, showing a pair of mount assemblies, each of the mount assemblies shown attached to a respective one of a pair of sleeves, and each one of the sleeves shown disposed about the axle and mechanically fastened to the axle via depressions to form the brake system component axle mount.

A first preferred embodiment brake system component axle mount of the present invention is shown generally at 205 in FIG. 2A, incorporated on an axle of the type typically utilized in a trailing arm air-ride overslung beam-type axle/suspension system, described in detail above, and which includes a pair of brake assemblies 228. First preferred embodiment brake system component axle mount 205 will be described in connection with brake assembly 228 which includes a cam shaft support/enclosure assembly 237 that utilizes a cam tube bracket 237A. Cam shaft support/enclosure assembly 237 described below and shown in the drawings is the subject of U.S. Pat. No. 6,240,806. Cam tube bracket 237A described below and shown in the drawings is the subject of U.S. Pat. No. 7,537,224. It should be understood that first preferred embodiment brake system component axle mount 205 could also be utilized with other types of brake assemblies, including brake assembly 28 described above and shown in FIG. 1, without changing the overall concept or operation of the present invention.

Because brake assemblies 228 are generally identical to one another, for the sake of clarity and brevity, only one of the brake assemblies will be described in detail below.

Figure 2B:
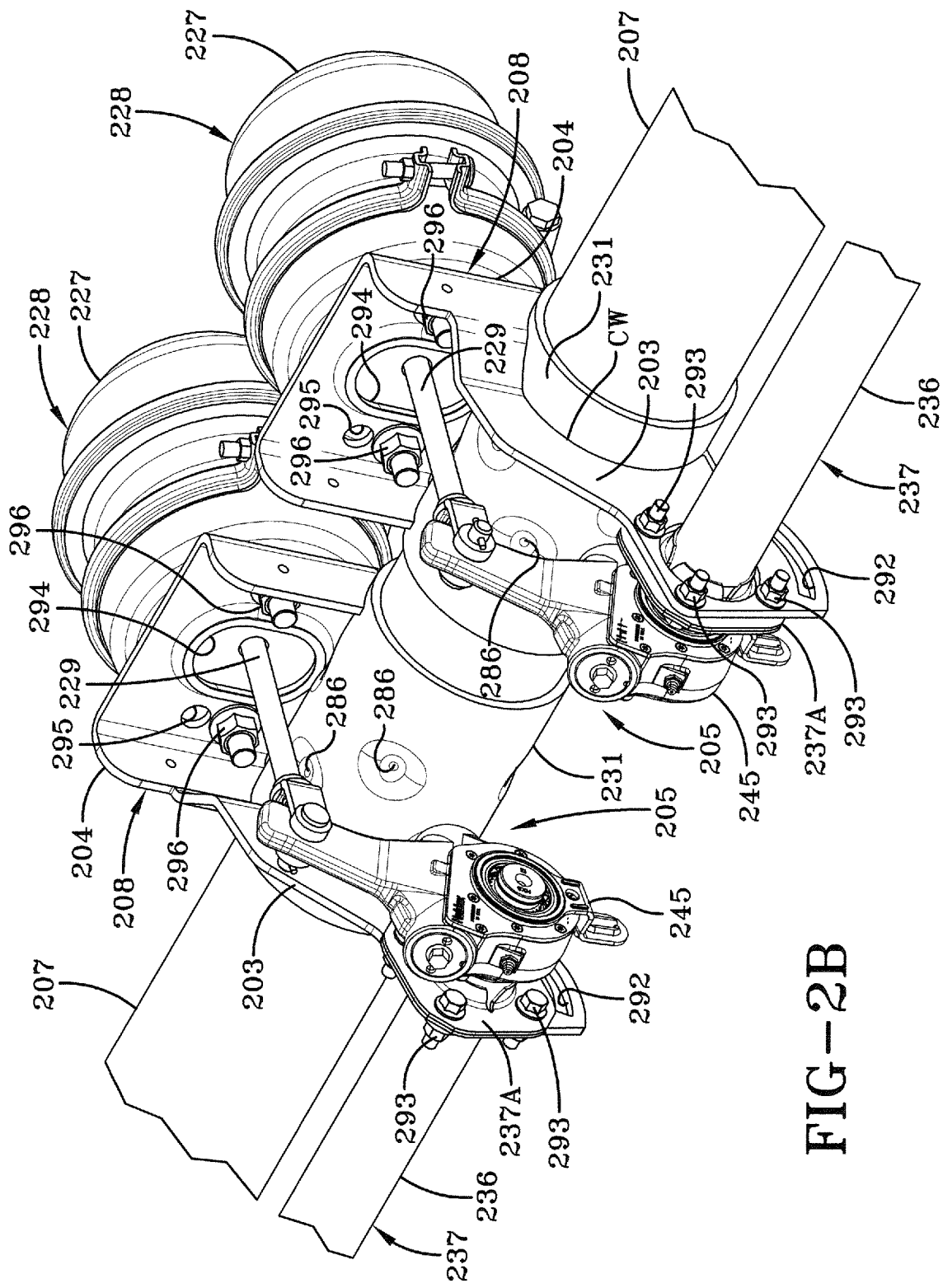
FIG. 2B is an enlarged fragmentary front perspective view similar to FIG. 2A, but also showing the depressions formed in the pair of sleeves.

With additional reference to FIG. 2B, brake assembly 228 includes a piston 229 which is operatively connected at one of its ends to a brake chamber 227, and at the other of its ends to a slack adjuster 245 as is well known in the art. An inboard end of a transversely extending cam shaft (not shown) extending out of the inboard end of a cam tube 236 is operatively connected to slack adjuster 245. Cam tube 236 is one of the components of cam shaft support/enclosure assembly 237. Cam tube 236 has outboard and inboard bushings and seals (not shown) friction fit in its outboard an inboard ends, respectively. The cam shaft is rotatably mounted in and passes completely through the outboard and inboard bushings of cam tube 236. The outboard end of the cam shaft (not shown) is immovably attached to an S-cam 239, so that the S-cam is exposed and is located adjacent to the cam tube outboard end. S-cam 239 moves brake shoes (not shown) against a brake drum of the respective vehicle wheel (not shown) to decelerate the vehicle during operation. The outboard end of cam tube 236 is captured by a brake spider 238, which is mounted on the outboard end of an axle 207. Brake spider 238 stabilizes the outboard end of cam tube 236 and thus also stabilizes the outboard end of cam shaft support/enclosure assembly 237. Cam tube bracket 237A is disposed about the inboard end of cam tube 236, and is immovably mounted on first preferred embodiment brake system component axle mount 205 of the present invention, as will be described in detail below. Cam tube bracket 237A, in conjunction with first preferred embodiment brake system component axle mount 205, stabilizes the inboard end of cam tube 236 and thus stabilizes the inboard end of cam shaft support/enclosure assembly 237, and prohibits the cam shaft support/enclosure assembly from rotating during operation of the vehicle.

In accordance with one of the primary features of the present invention and with additional reference to FIGS. 2C-2F, first preferred embodiment brake system component axle mount 205 of the present invention includes a mount assembly 208 and a sleeve 231. Mount assembly 208 is rigidly attached to sleeve 231 by welds at a junction CW between the mount assembly and the sleeve. Mount assembly 208 includes an integrally formed cam bracket 203 and a brake chamber bracket 204. Cam bracket 203 is formed with a large opening 290. Four additional small openings 291 are formed in cam bracket 203 adjacent and surrounding large opening 290. Cam tube bracket 237A, through which the inboard end of cam tube 238 is disposed, is mounted on cam bracket 203 in opening 290 by fasteners 293, which are passed through openings formed in the cam tube bracket (not shown) and aligned small openings 291 formed in the cam bracket. In this manner, cam shaft support/enclosure assembly 237 is stabilized by mount assembly cam bracket 203. An elongated opening 292, which is used as a guide for an automatic adjustment mechanism (not shown) on slack adjuster 245, is formed in cam bracket 203 below large opening 290. Mount assembly brake chamber bracket 204 is formed with a large elongated opening 294 through which piston 229 passes. Pairs of small openings 295 are formed in brake chamber bracket 204 inboardly and outboardly of large elongated opening 294. Each one of a pair of brake chamber fasteners 296 is disposed through a respective selected one of the pairs of openings 295 of brake chamber bracket 204 in order to secure brake chamber 227 to the brake chamber.

Figure 2C:
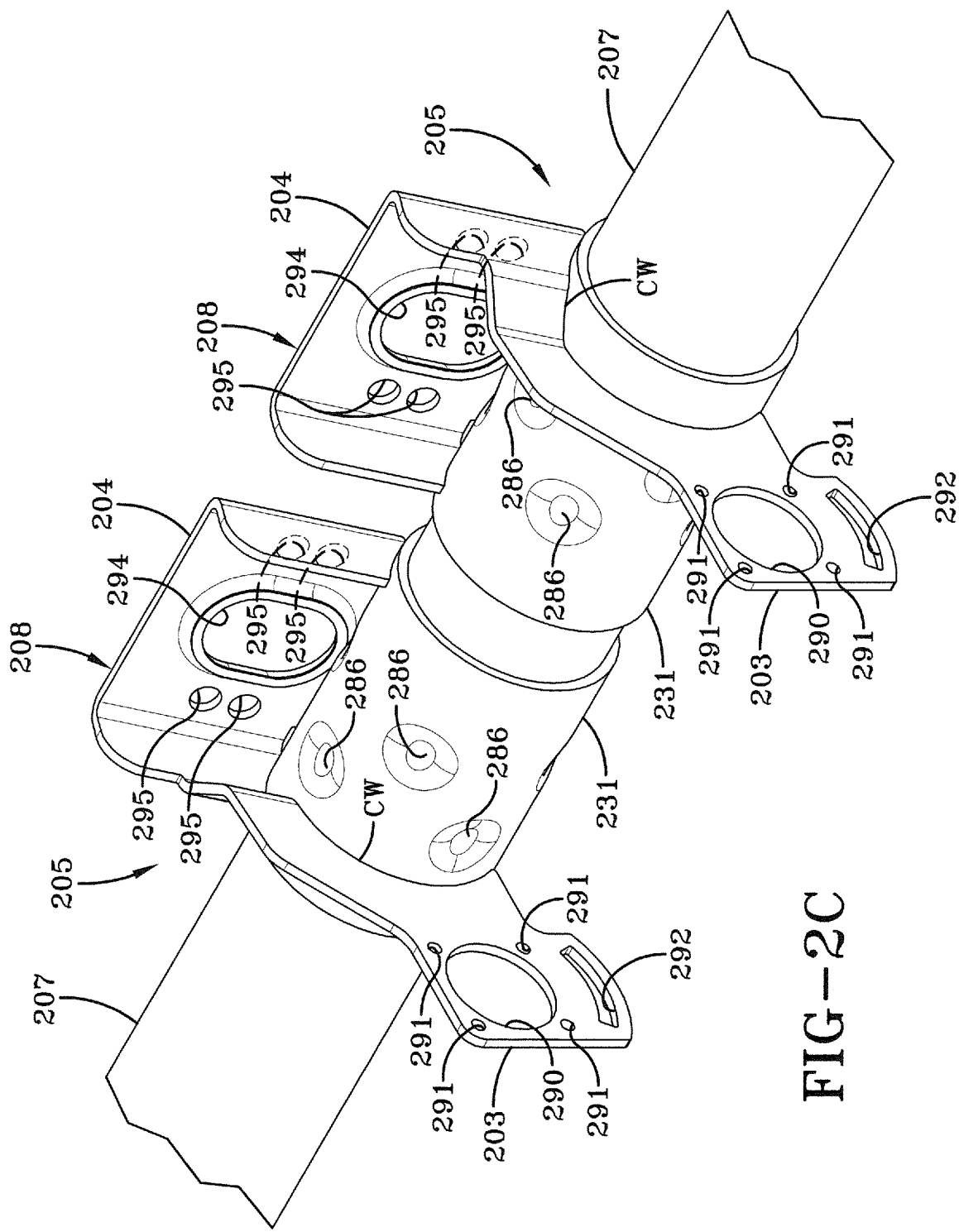
FIG. 2C is a greatly enlarged fragmentary front perspective view similar to FIG. 2B, but with the brake assemblies removed.
Figure 2D:
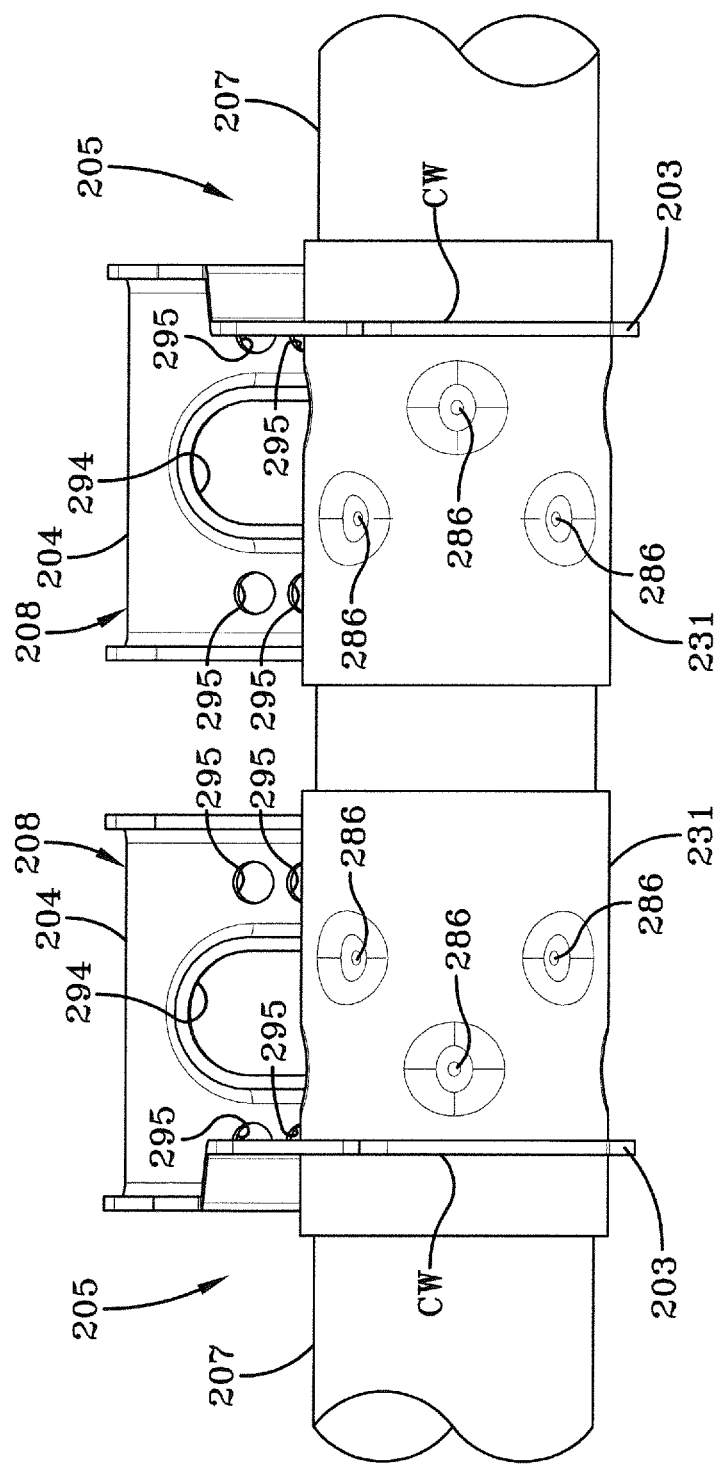
FIG. 2D is an enlarged fragmentary front elevational view of FIG. 2C.
Figure 2E:
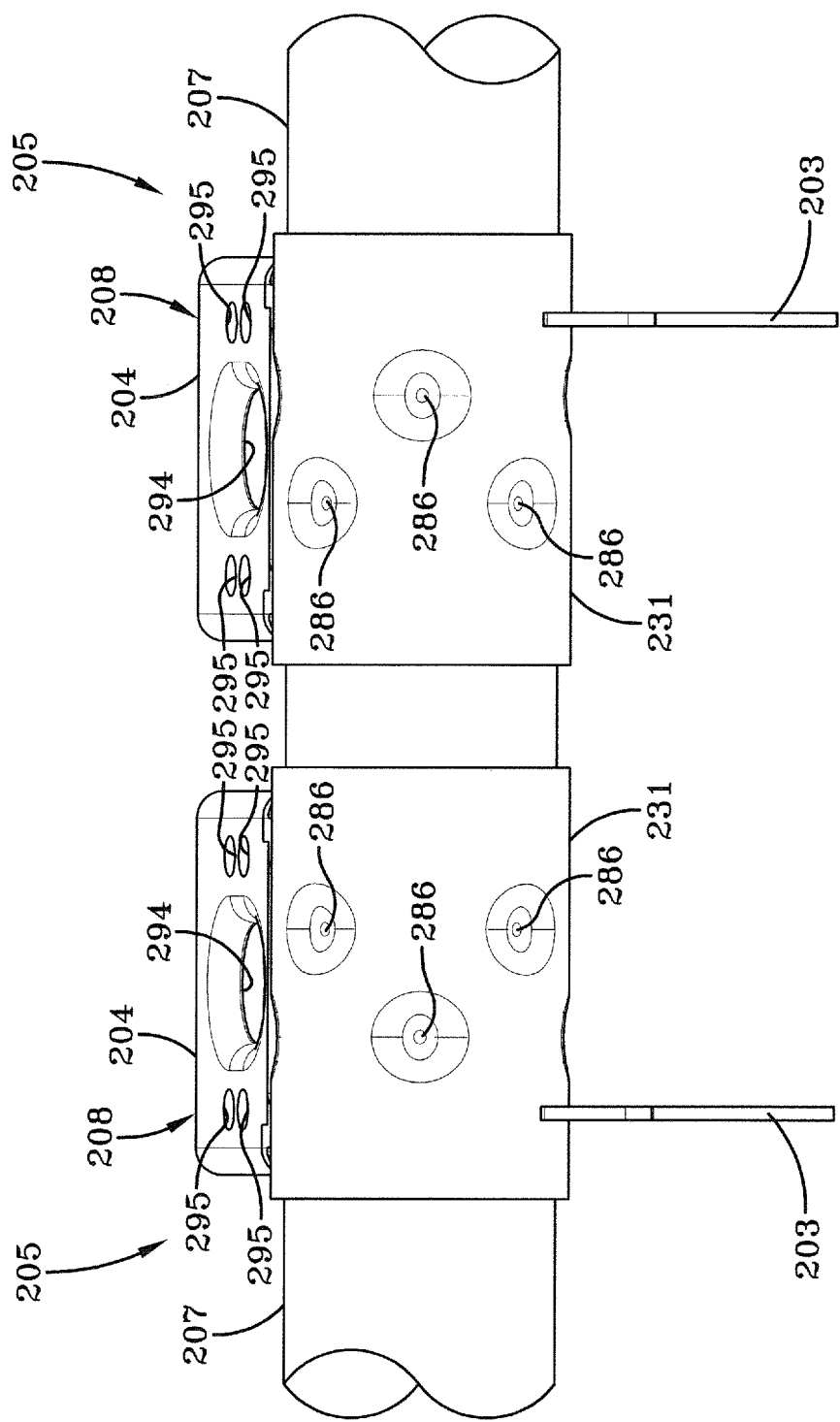
FIG. 2E is an enlarged fragmentary top elevational view of FIG. 2C.
Figure 2F:
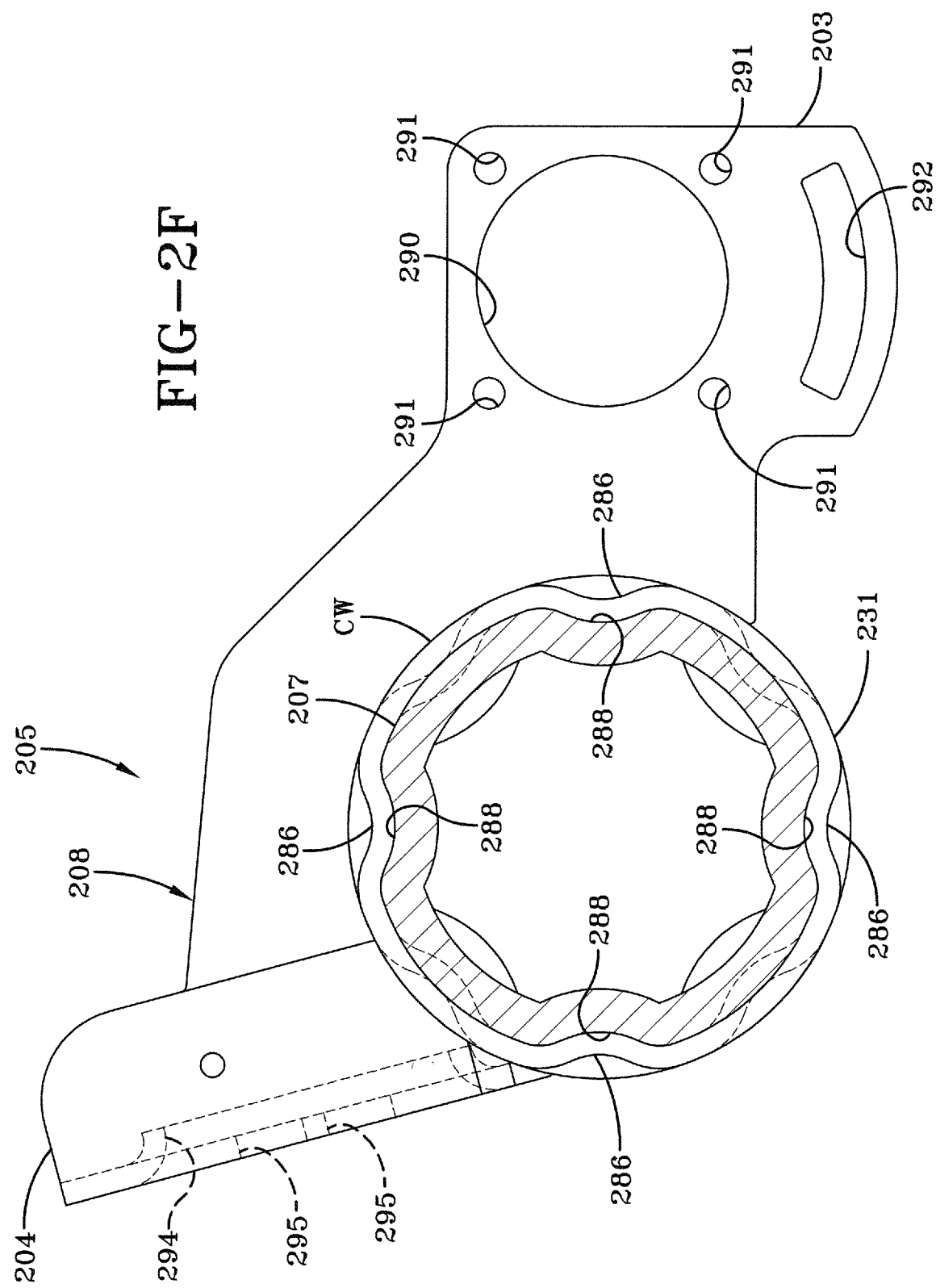
FIG. 2F is a sectional view of the axle and the sleeve of one of the brake system component axle mounts shown in FIG. 2E, and showing the depressions formed in the sleeve and the axle.

With particular reference to FIG. 2F, and in accordance with one of the primary features of the present invention, sleeve 231 is disposed about axle 207 and each are formed with mated pairs of depressions 286 and 288, respectively. More particularly, eight mated pairs of depressions 286,288 are formed in offset or staggered rows around the circumference of sleeve 231 and axle 207. Each mated pair of depressions 286,288 engage one another and serve as a mechanical joint or lock between sleeve 231 and axle 207. It should be understood that at least one mated pair of depressions is necessary in order for brake system component axle mount 205 of the present invention to function properly, but from one to seven and also more than eight mated pairs of depressions could be utilized without changing the overall concept or operation of the present invention. In addition, at least one of the eight mated pairs of depressions 286,288 exhibits sufficient contact to eliminate welds between sleeve 231 and axle 207. It is understood that the mechanical lock between sleeve 231 and axle 207 generally prevents rotation and lateral movement of the sleeve and the axle relative to one another.

Sleeve 231 is a generally rectangular shaped flat piece of metal, which is formed around axle 207 in a manner well known in the art. A weld (not shown) is placed along the edges of the seam (not shown) of sleeve 231 in order to dispose the sleeve around axle 207. It should be understood that sleeve 231 could also be formed from a tube having an inner diameter equal to or slightly larger than the outer diameter of axle 207. In such an instance, sleeve 231 is cut to size and then slip fit over the end of axle 207. Sleeve 231 is optionally swaged, squeezed or crimped onto axle 207 by a swaging device as is well known in the art, creating sufficient contact between the sleeve and the axle. Eight mated pairs of depressions 286 and 288 are plastically formed in sleeve 231 and axle 207, respectively, by a press.

More particularly, sleeve 231 and axle 207 are placed into a press (not shown) having a pin (not shown), whereby the pin is pressed into the exterior surface of the sleeve and the axle by the press and then retracted, thereby forming each mated pair of depressions 286, 288 in the sleeve and the axle, respectively. More specifically, a first mated pair of depressions 286,288 is simultaneously formed in sleeve 231 and axle 207, respectively. Then a second mated pair of depressions 286,288 is simultaneously formed in sleeve 231 and axle 207, respectively, and so on until all eight mated pairs of the depressions have been formed in the sleeve and the axle. Axle 207 is supported in a manner generally well known in the art such that the axle does not collapse during formation of the depressions.

After depressions 286,288 have been formed in sleeve 231 and axle 207, respectively, mount assembly 208 is attached to the exterior surface of sleeve 231. More specifically, a weld (not shown), is laid along junction CW between sleeve 231 and the exterior surface of mount assembly 208. In this manner, first preferred embodiment brake system component axle mount 205 of the present invention is formed without welding axle 207. Alternatively, mount assembly 208 could be attached to the exterior surface of sleeve 231 prior to the formation of depressions 286,288, without changing the overall concept or operation of the present invention.

As set forth above in the detailed description of brake system component axle mount 205 of the present invention, the brake system component axle mount results in a mechanical lock and sufficient contact of sleeve 231 to axle 207 which is free of welds or additional mechanical fasteners. More particularly, brake system component axle mount 205 of the present invention creates sufficient contact between at least one of, and preferably all of, the eight mated pairs of depressions 286,288 of sleeve 231 and axle 207, respectively, to provide durability and strength to the sleeve to axle connection. Preferably, the contact creates a pre-load or compression at depressions 286,288 of sleeve 231 and axle 207, respectively. Because sleeve 231 is formed from a different material than the material used to form axle 207, the sleeve exhibits a more plastic deformation while the axle exhibits a more elastic deformation. As a result, axle 207 exhibits more spring-back than sleeve 231 during the depression forming process, aiding in creating the sufficient contact between the sleeve and the axle. It should be understood that the extent of the preload or compression exhibited by mated depressions 286,288 of sleeve 231 and axle 207, respectively, is dependant on the yield strength of the materials used in forming the sleeve and the axle, as well as the relative thicknesses of the sleeve and the axle. Therefore, by changing the types of materials used for sleeve 231 and axle 207 as well as varying the thicknesses of each, brake system component axle mount 205 can be tuned to create an increased or decreased preload or compression at depressions 286,288 in order to optimize the sufficient contact of the brake system component axle mount. Residual stresses preferably also are created at each one of the eight mated pairs of depressions 286,288 of sleeve 231 and axle 207, respectively, as a result of the forming process. These residual stresses also aid in creating the sufficient contact and in reacting loads encountered by the brake assembly during operation of the heavy-duty vehicle. Swaging, as described above, can also contribute to sufficient contact at the sleeve to axle connection.

It is further contemplated that an adhesive could optionally be applied to the interior surface of sleeve 231 or to the exterior surface of axle 207 at the sleeve-to-axle interface, prior to formation of depressions 286,288. Because brake system component axle mount 205 of the present invention eliminates welds directly on axle 207 and the stress risers and local mechanical property changes that occur with such welds, the durability of the axle can be improved.

It is contemplated that other shapes and arrangements of depressions 286,288 could also be utilized without changing the overall concept of the present invention. It is also contemplated that variations of depressions 286,288 could also be utilized, such as a generally hexagonal flat depression (not shown), without changing the overall concept or operation of the present invention. Other shapes, sizes and numbers of depressions 286,288 are also contemplated and could be utilized in conjunction with the present invention.

The manner in which brake system component axle mount 205 is formed eliminates tolerance issues with respect to alignment of depressions 286,288 formed in sleeve 231 and axle 207, respectively, because each one of the mated pairs of depressions are simultaneously formed in the sleeve and the axle.

It is understood that other brake assemblies, such as brake assembly 28 shown in FIG. 1 and described in detail above, or other brake assemblies that typically mount brake system components on an axle using brackets, welds, or the like, could be utilized in conjunction with first preferred embodiment brake system component axle mount 205 of the present invention without changing the overall concept or operation of the present invention.

Figure 3A:
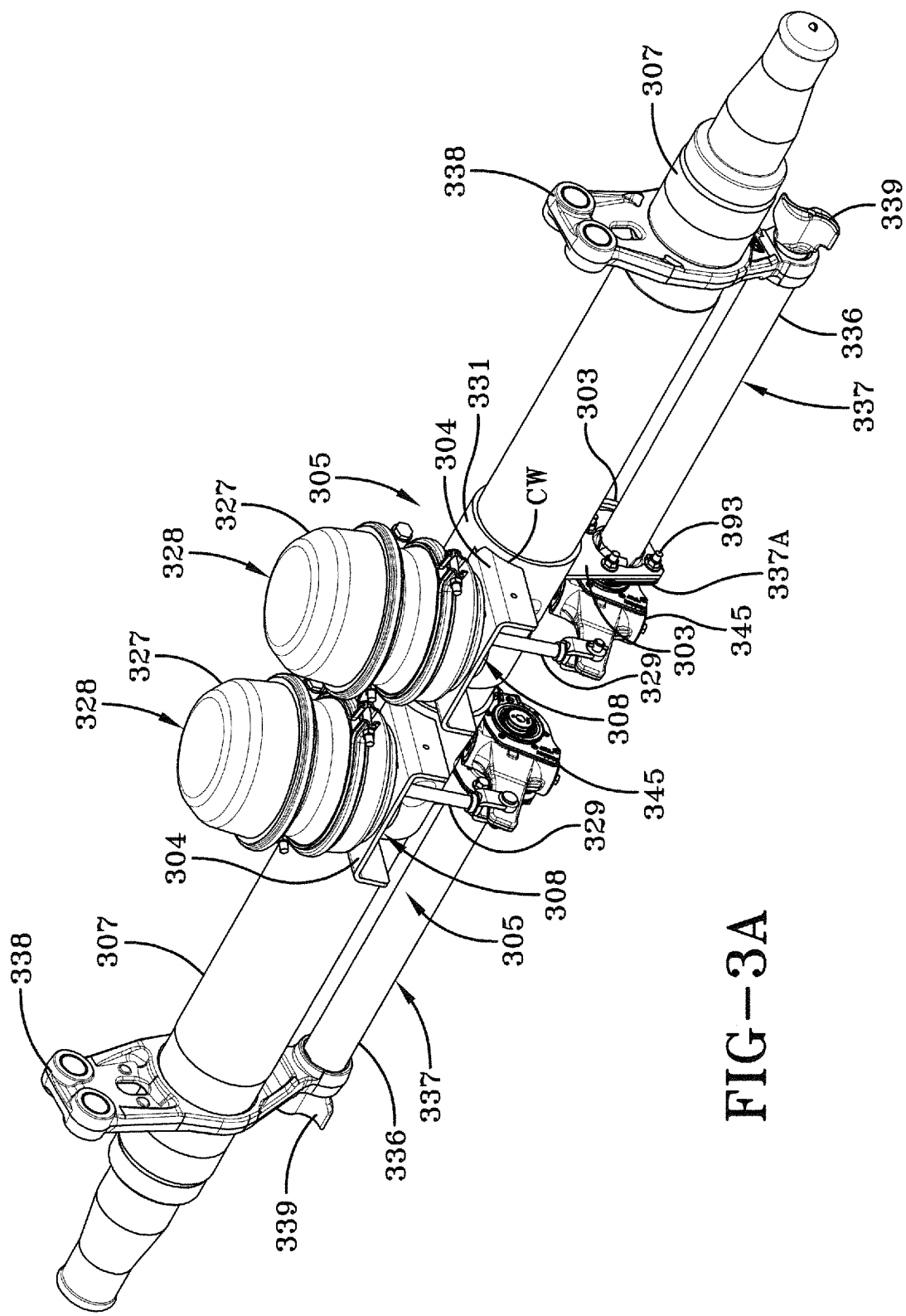
FIG. 3A is a bottom perspective view of an axle and a pair of brake assemblies, each of the brake assemblies shown mounted on the axle by a second preferred embodiment brake system component axle mount of the present invention, showing a pair of mount assemblies, each of the mount assemblies shown attached to a respective one of a pair of sleeves, and each one of the sleeves shown disposed about the axle and mechanically fastened to the axle via depressions to form the brake system component axle mount.

A second preferred embodiment brake system component axle mount of the present invention is shown generally at 305 in FIG. 3A, incorporated on an axle of the type typically utilized in a trailing arm air-ride overslung beam-type axle/suspension system, described in detail above, and which includes a pair of brake assemblies 328. Second preferred embodiment brake system component axle mount 305 will be described in connection with brake assembly 328 which includes a cam shaft support/enclosure assembly 337 that utilizes a cam tube bracket 337A. Cam shaft support/enclosure assembly 337 described below and shown in the drawings is the subject of U.S. Pat. No. 6,240,806. Cam tube bracket 337A described below and shown in the drawings is the subject of U.S. Pat. No. 7,537,224. It should be understood that first preferred embodiment brake system component axle mount 305 could also be utilized with other types of brake assemblies, including brake assembly 28 described above and shown in FIG. 1, without changing the overall concept or operation of the present invention. Because brake assemblies 328 are generally identical to one another, for the sake of clarity and brevity, only one of the brake assemblies will be described in detail below.

Figure 3B:
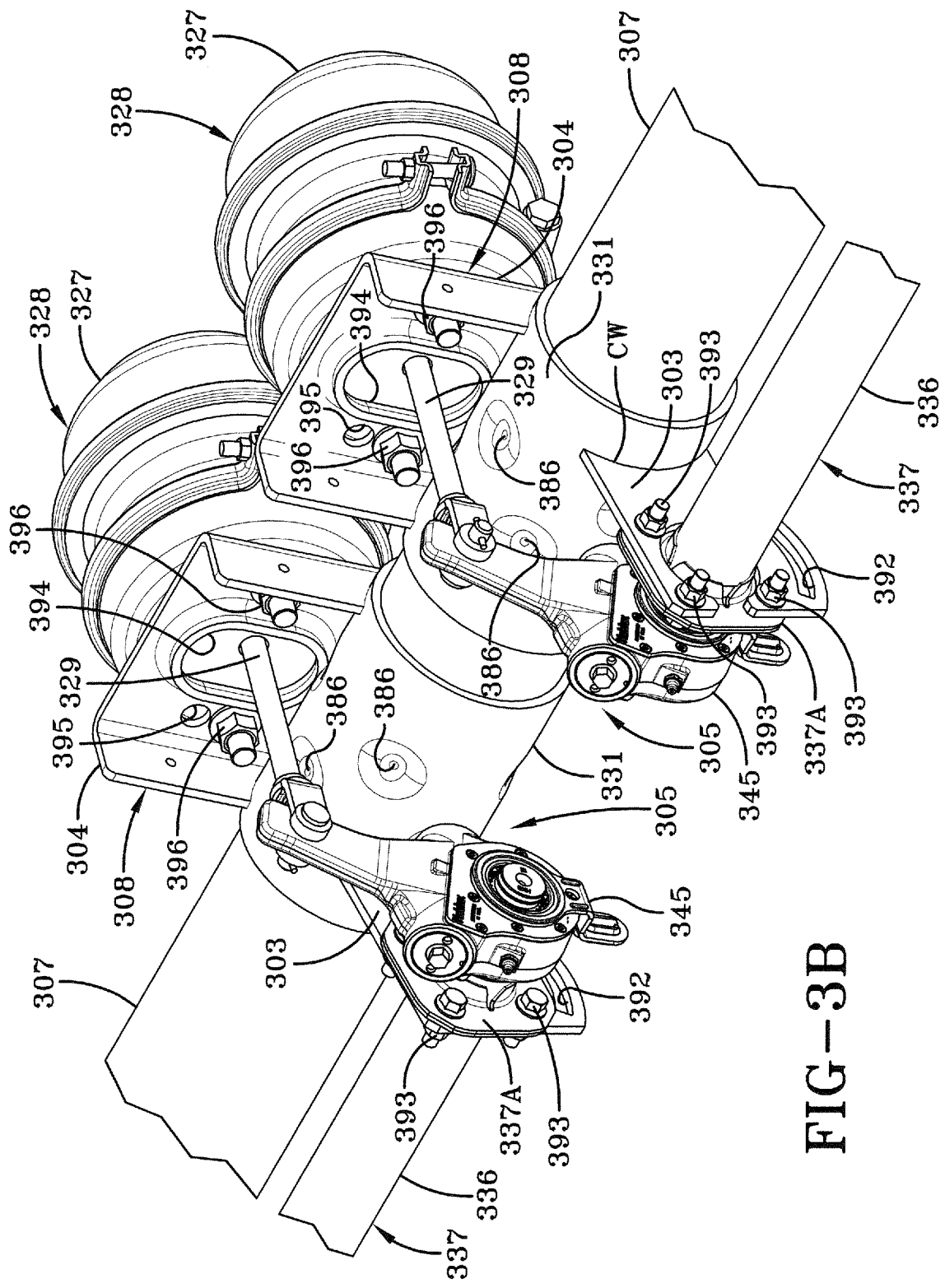
FIG. 3B is an enlarged fragmentary front perspective view similar to FIG. 3A, but also showing the depressions formed in the pair of sleeves.

With additional reference to FIG. 3B, brake assembly 328 includes a piston 329 which is operatively connected at one of its ends to a brake chamber 327, and at the other of its ends to a slack adjuster 345 as is well known in the art. An inboard end of a transversely extending cam shaft (not shown) extending out of the inboard end of a cam tube 336 is operatively connected to slack adjuster 345. Cam tube 336 is one of the components of a cam shaft support/enclosure assembly 337. Cam tube 336 has outboard and inboard bushings and seals (not shown) friction fit in its outboard an inboard ends, respectively. The cam shaft is rotatably mounted in and passes completely through the outboard and inboard bushings of cam tube 336. The outboard end of the cam shaft (not shown) is immovably attached to an S-cam 339, so that the S-cam is exposed and is located adjacent to the cam tube outboard end. S-cam 339 moves brake shoes (not shown) against a brake drum of the respective vehicle wheel (not shown) to decelerate the vehicle during operation. The outboard end of cam tube 336 is captured by a brake spider 338 which is mounted on the outboard end of an axle 307. Brake spider 338 stabilizes the outboard end of cam tube 336 and thus also stabilizes the outboard end of cam shaft support/enclosure assembly 337. A cam tube bracket 337A is disposed about the inboard end of cam tube 336, and is immovably mounted on second preferred embodiment brake system component axle mount 305 of the present invention, as will be described in detail below. Cam tube bracket 337A, in conjunction with second preferred embodiment brake system component axle mount 305, stabilizes the inboard end of cam tube 336 and thus stabilizes the inboard end of cam shaft support/enclosure assembly 337, and prohibits the cam shaft support/enclosure assembly from rotating during operation of the vehicle.

In accordance with one of the primary features of the present invention and with additional reference to FIGS. 3C-3F, second preferred embodiment brake system component axle mount 305 of the present invention includes a mount assembly 308 and a sleeve 331. Mount assembly 308 is rigidly attached to sleeve 331 by welds at a junction CW between the mount assembly and the sleeve. Mount assembly 308 includes a cam bracket 303 spaced-apart from a brake chamber bracket 304. Cam bracket 303 is formed with a large opening 390. Four additional small openings 391 are formed in cam bracket 303 adjacent and surrounding large opening 390. Cam tube bracket 337A, through which the inboard end of cam tube 338 is disposed, is mounted on cam bracket 303 in opening 390 by fasteners 393, which are passed through openings formed in the cam tube bracket (not shown) and aligned small openings 391 formed in the cam bracket. In this manner, cam shaft support/enclosure assembly 337 is stabilized by mount assembly cam bracket 303. An elongated opening 392, which is used as a guide for an automatic adjustment mechanism (not shown) on slack adjuster 245, is formed in cam bracket 303 below large opening 390. Mount assembly brake chamber bracket 304 is formed with a large elongated opening 394 through which piston 329 passes. Pairs of small openings 395 are formed in brake chamber bracket 304 inboardly and outboardly of large elongated opening 394. Each one of a pair of brake chamber fasteners 396 is disposed through a respective selected one of the pairs of openings 395 of brake chamber bracket 304 in order to secure brake chamber 327 to the brake chamber.

With particular reference to FIG. 3F, and in accordance with one of the primary features of the present invention, sleeve 331 is disposed about axle 307 and each are formed with mated pairs of depressions 386 and 388, respectively. More particularly, eight mated pairs of depressions 386,388 are formed in offset or staggered rows around the circumference of sleeve 331 and axle 307. Each mated pair of depressions 386,388 engage one another and serve as a mechanical joint or lock between sleeve 331 and axle 307. It should be understood that at least one mated pair of depressions is necessary in order for brake system component axle mount 305 of the present invention to function properly, but from one to seven and also more than eight mated pairs of depressions could be utilized without changing the overall concept or operation of the present invention. In addition, at least one of the eight mated pairs of depressions 386,388 exhibits sufficient contact to eliminate welds between sleeve 331 and axle 307. It is understood that the mechanical lock between sleeve 331 and axle 307 generally prevents rotation and lateral movement of the sleeve and the axle relative to one another.

Sleeve 331 is a generally rectangular shaped flat piece of metal, which is formed around axle 307 in a manner well known in the art. A weld (not shown) is placed along the edges of the seam (not shown) of sleeve 331 in order to dispose the sleeve around axle 307. It should be understood that sleeve 331 could also be formed from a tube having an inner diameter equal to or slightly larger than the outer diameter of axle 307. In such an instance, sleeve 331 is cut to size and then slip fit over the end of axle 307. Sleeve 331 is optionally swaged, squeezed or crimped onto axle 307 by a swaging device as is well known in the art, creating sufficient contact between the sleeve and the axle. Eight mated pairs of depressions 386 and 388 are plastically formed in sleeve 331 and axle 307, respectively, by a press. More particularly, sleeve 331 and axle 307 are placed into a press (not shown) having a pin (not shown), whereby the pin is pressed into the exterior surface of the sleeve and the axle by the press and then retracted, thereby forming each mated pair of depressions 386, 388 in the sleeve and the axle, respectively. More specifically, a first mated pair of depressions 386,388 is simultaneously formed in sleeve 331 and axle 307, respectively. Then a second mated pair of depressions 386,388 is simultaneously formed in sleeve 331 and axle 307, respectively, and so on until all eight mated pairs of the depressions have been formed in the sleeve and the axle. Axle 307 is supported in a manner generally well known in the art such that the axle does not collapse during formation of the depressions.

After depressions 386,388 have been formed in sleeve 331 and axle 307, respectively, mount assembly 308, which includes cam bracket 303 and brake chamber bracket 304, is attached to the exterior surface of sleeve 331. More specifically, a weld (not shown), is laid along junction CW between sleeve 331 and the exterior surface of mount assembly cam bracket 303 and mount assembly brake chamber bracket 304. In this manner, second preferred embodiment brake system component axle mount 305 of the present invention is formed without welding axle 307. Alternatively, mount assembly cam bracket 303 and mount assembly brake chamber bracket 304 could be attached to the exterior surface of sleeve 331 prior to the formation of depressions 386,388, without changing the overall concept or operation of the present invention.

As set forth above in the detailed description of brake system component axle mount 305 of the present invention, the brake system component axle mount results in a mechanical lock and sufficient contact of sleeve 331 to axle 307 which is free of welds or additional mechanical fasteners. More particularly, brake system component axle mount 305 of the present invention creates sufficient contact between at least one of, and preferably all of, the eight mated pairs of depressions 386,388 of sleeve 331 and axle 307, respectively, to provide durability and strength to the sleeve to axle connection. Preferably, the contact creates a pre-load or compression at depressions 386,388 of sleeve 331 and axle 307, respectively. Because sleeve 331 is formed from a different material than the material used to form axle 307, the sleeve exhibits a more plastic deformation while the axle exhibits a more elastic deformation. As a result, axle 307 exhibits more spring-back than sleeve 331 during the depression forming process, aiding in creating the sufficient contact between the sleeve and the axle. It should be understood that the extent of the preload or compression exhibited by mated depressions 386,388 of sleeve 331 and axle 307, respectively, is dependant on the yield strength of the materials used in forming the sleeve and the axle, as well as the relative thicknesses of the sleeve and the axle.

Therefore, by changing the types of materials used for sleeve 331 and axle 307 as well as varying the thicknesses of each, brake system component axle mount 305 can be tuned to create an increased or decreased preload or compression at depressions 386,388 in order to optimize the sufficient contact of the brake system component axle mount. Residual stresses preferably also are created at each one of the eight mated pairs of depressions 386,388 of sleeve 331 and axle 307, respectively, as a result of the forming process. These residual stresses also aid in creating the sufficient contact and in reacting loads encountered by the brake assembly during operation of the heavy-duty vehicle. Swaging, as described above, can also contribute to sufficient contact at the sleeve to axle connection.

It is further contemplated that an adhesive could optionally be applied to the interior surface of sleeve 331 or to the exterior surface of axle 307 at the sleeve-to-axle interface, prior to formation of depressions 386,388. Because brake system component axle mount 305 of the present invention eliminates welds directly on axle 307 and the stress risers and local mechanical property changes that occur with such welds, the durability of the axle can be improved.

It is contemplated that other shapes and arrangements of depressions 386,388 could also be utilized without changing the overall concept of the present invention. It is also contemplated that variations of depressions 386,388 could also be utilized, such as a generally hexagonal flat depression (not shown), without changing the overall concept or operation of the present invention. Other shapes, sizes and numbers of depressions 386,388 are also contemplated and could be utilized in conjunction with the present invention.

The manner in which brake system component axle mount 305 is formed eliminates tolerance issues with respect to alignment of depressions 386,388 formed in sleeve 331 and axle 307, respectively, because each one of the mated pairs of depressions are simultaneously formed in the sleeve and the axle.

It is understood that other brake assemblies, such as brake assembly 28 shown in FIG. 1 and described in detail above, or other brake assemblies that typically mount brake system components on an axle using brackets, welds, or the like, could be utilized in conjunction with second preferred embodiment brake system component axle mount 305 of the present invention without changing the overall concept or operation of the present invention.

Brake system component axle mounts 205,305 of the present invention overcome the types of potential issues associated with prior art brake mounts which, because brackets 47 and 51 or other similar functioning structures, are welded directly to axle 7, can potentially create significant stress risers and local mechanical property changes in the axle, as is generally well known in the art. These stress risers and local mechanical property changes can in turn potentially reduce the life expectancy of axle 7.

Brake system component axle mounts 205,305 of the present invention overcome the potential issues associated with the prior art brake system component mounts by eliminating all of the welds between the brake system component mount brackets 203,303,204,304 and axle 207, 307, respectively, and thereby producing a mechanical lock which eliminates all of the stress risers and local mechanical property changes in the axle caused by welds as described above. Furthermore, brake system component axle mounts 205,305 of the present invention increase durability of axles 207,307, by eliminating welds directly on the axle, thereby improving the life expectancy and durability of the axle. It is also possible that by eliminating welds directly on axle 207,307 and the stress risers and local mechanical property changes that occur with such welds, that the thickness of the axle could potentially be reduced for certain applications, thereby potentially allowing for weight savings in the axle/suspension system.

In addition brake system component axle mounts 205,305 of the present invention result in a mechanical lock of the mount assembly and sleeve to the axle which is free of welds or additional mechanical fasteners. More particularly, brake system component axle mounts 205,305 of the present invention generally prevent rotation and lateral movement of the axle and sleeve relative to one another, and also create sufficient contact between at least one of and preferably all of, the mated pairs of depressions of the sleeve and the axle, respectively, to provide durability and strength to the sleeve to axle connection. Preferably, the sufficient contact creates a pre-load or compression in at least one of, and preferably all of, the pairs of mated depressions formed in the sleeve and the axle, respectively. Because the sleeve is formed from a different material than the material used to form the axle, the sleeve exhibits a more plastic deformation while the axle exhibits a more elastic deformation. As a result, the axle exhibits more spring-back than the sleeve during the depression forming process, aiding in creating the sufficient contact between the sleeve and the axle. It should be understood that the extent of the preload or compression exhibited by the depressions of the sleeve and the axle, respectively, is dependant on the yield strength of the materials used in forming the sleeve and the axle as well as the relative thicknesses of the sleeve and the axle. Therefore, by changing the types of materials used for the sleeve and the axle as well as varying the thicknesses of each, brake system component axle mounts 205,305 can be tuned to create an increased or decreased preload or compression at the depressions in order to optimize the sufficient contact of the sleeve to axle connection. Residual stresses preferably also are created at the mated pairs of the depressions of the sleeve and the axle, respectively, as a result of the forming process. These residual stresses also aid in creating the sufficient contact and in reacting loads encountered by the brake assembly during operation of the heavy-duty vehicle. In certain embodiments, swaging, as described above, can also contribute to sufficient contact at the sleeve to axle connection.

The manner in which brake system component axle mounts 205,305 are formed eliminate tolerance issues with respect to alignment of the mated pairs of depressions formed in the sleeve and the axle, because each one of the mated pairs of depressions are simultaneously formed in the sleeve and the axle.

Figure 3C:
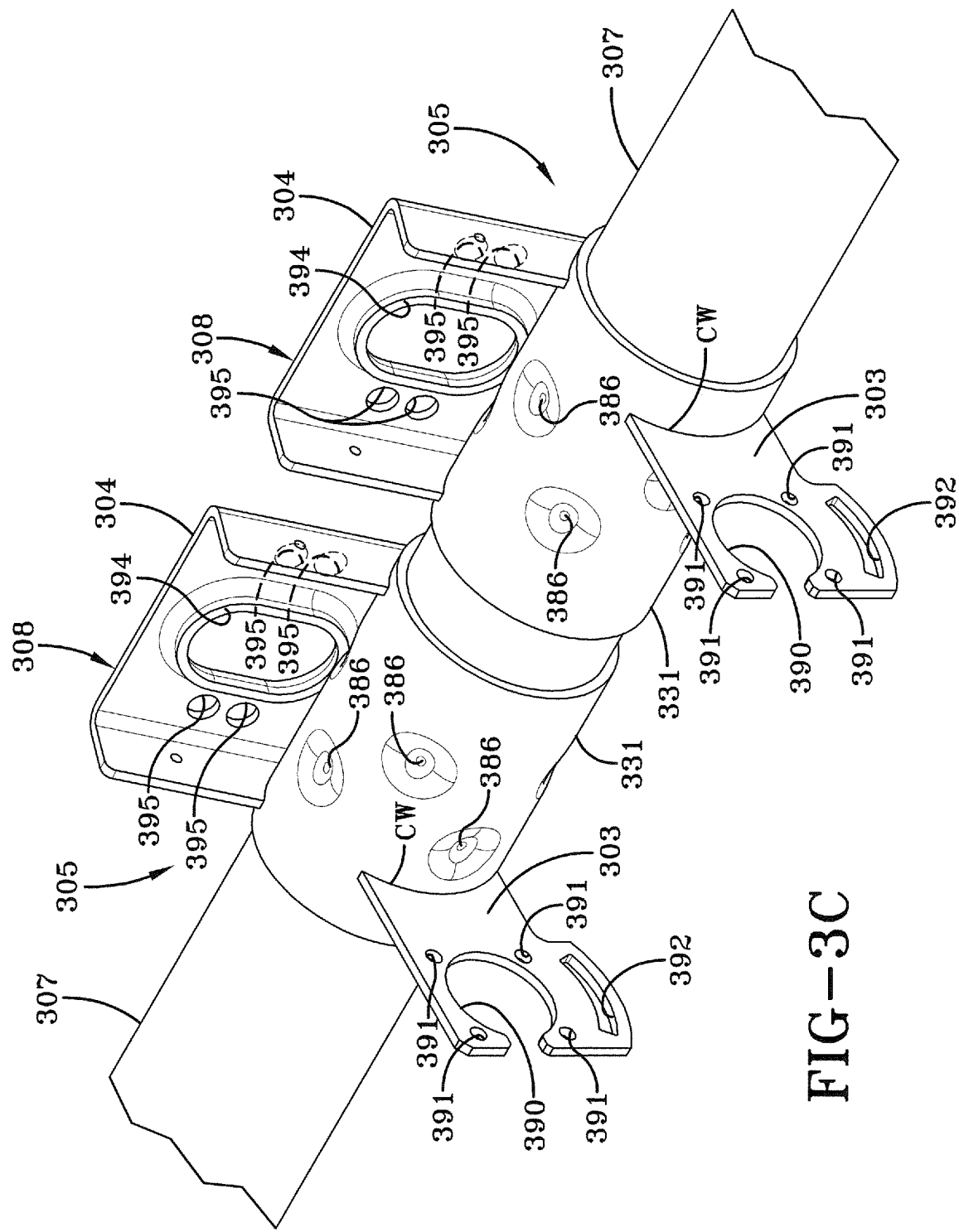
FIG. 3C is a greatly enlarged fragmentary front perspective view similar to FIG. 3B, but with the brake assemblies removed.
Figure 3D:
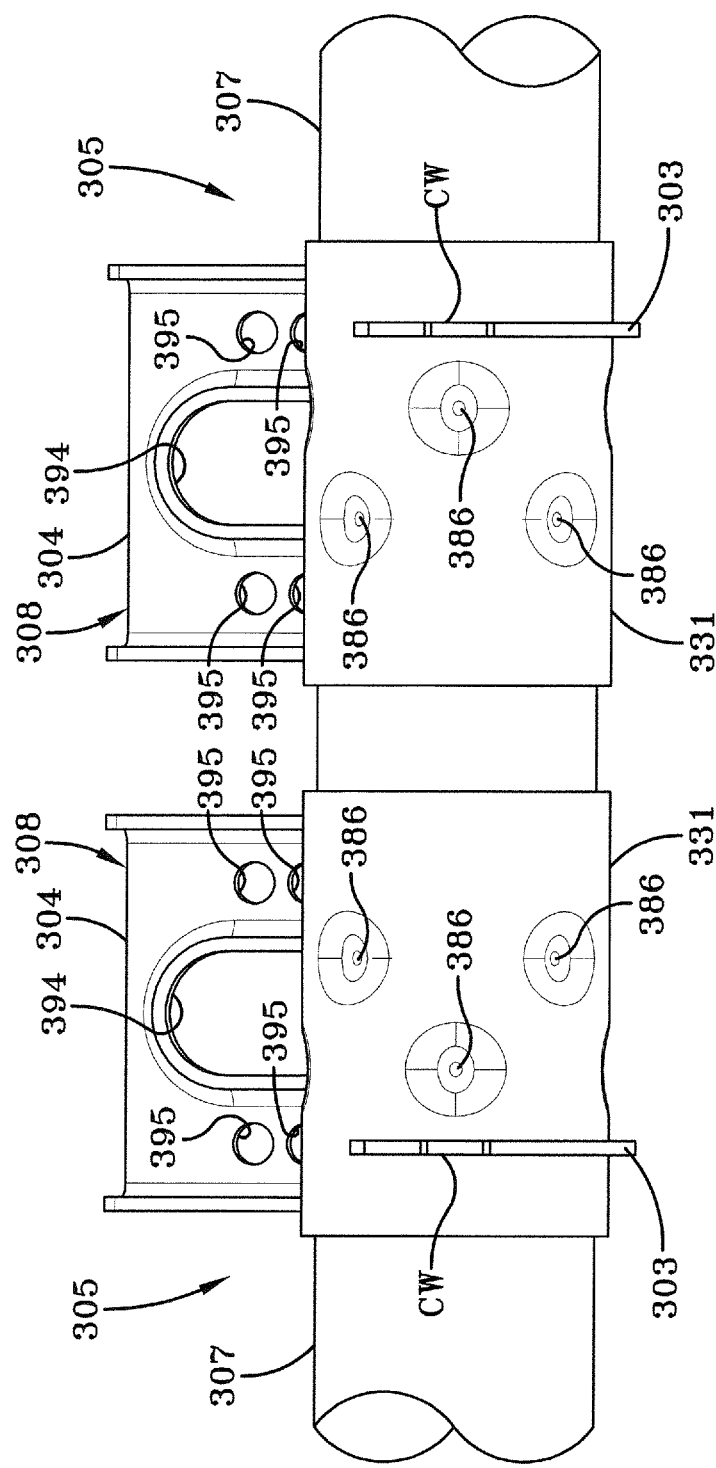
FIG. 3D is an enlarged fragmentary front elevational view of FIG. 3C.
Figure 3E:
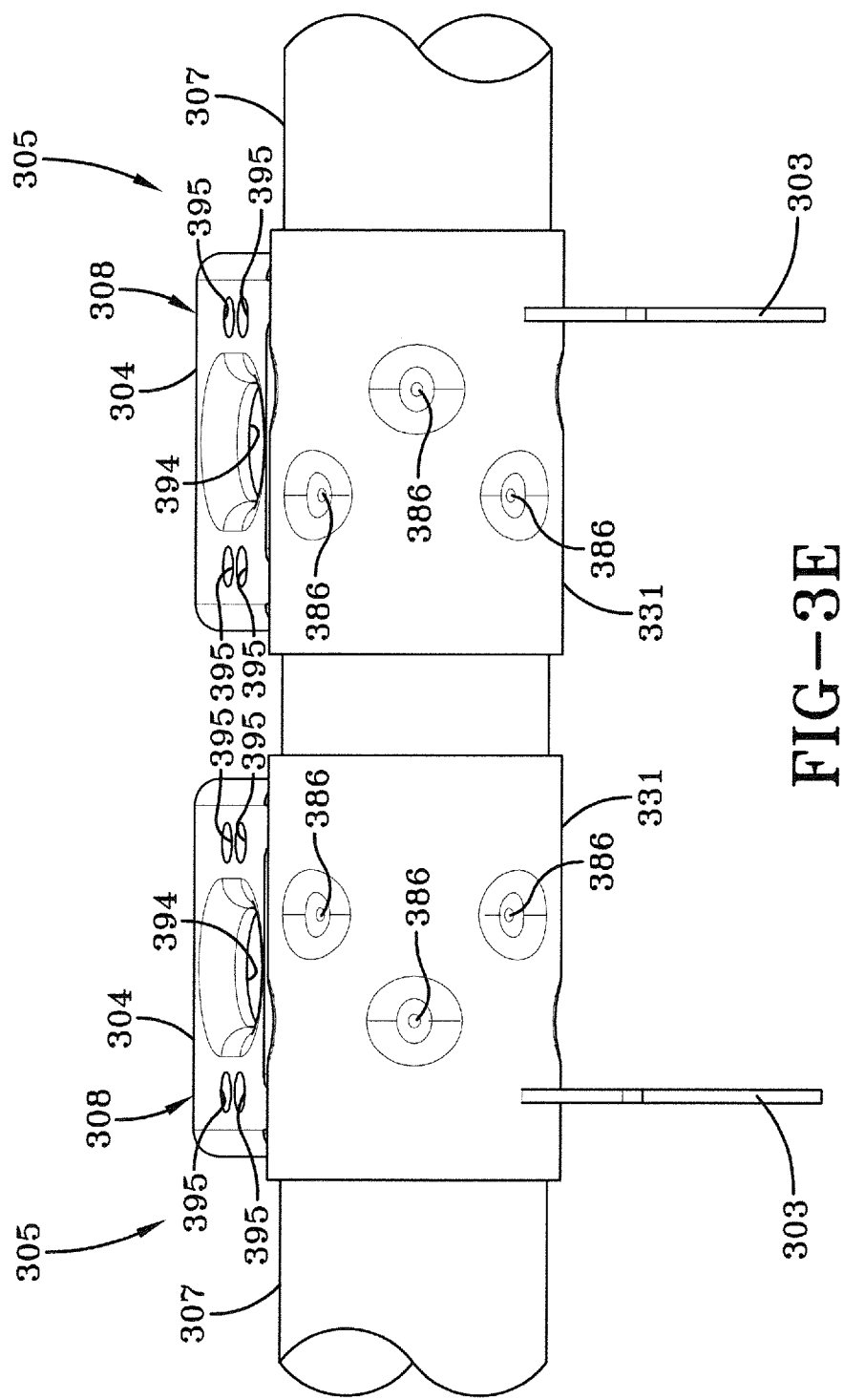
FIG. 3E is an enlarged fragmentary top elevational view of FIG. 3C.

It is contemplated that preferred embodiment brake system component axle mounts 205,305 of the present invention could be utilized on trucks, tractor-trailers or other heavy-duty vehicles having one or more than one axle without changing the overall concept or operation of the present invention. It is further contemplated that preferred embodiment brake system component axle mounts 205,305 of the present invention could be utilized in connection with vehicles having frames or subframes which are moveable or non-movable without changing the overall concept of the present invention. It is yet even further contemplated that preferred embodiment brake system component axle mounts 205,305 of the present invention could be utilized on all types of air-ride leading and/or trailing arm beam-type axle/suspension system designs known to those skilled in the art without changing the overall concept or operation of the present invention. For example, the present invention finds application in connection with axle/suspension systems having beams or arms that are made of materials other than steel, such as aluminum, other metals, metal alloys, composites, and/or combinations thereof. It is also contemplated that preferred embodiment brake system component axle mounts 205,305 of the present invention could be utilized in connection with axle/suspension systems having either an overslung/top-mount configuration or an underslung/bottom-mount configuration, without changing the overall concept of the present invention. The present invention also finds application in connection with axle/suspension systems having beams or arms with different designs and/or configurations than that shown and described herein, such as solid beams, shell-type beams, truss structures, intersecting plates, spring beams and parallel plates. It is yet even further contemplated that preferred embodiment brake system component axle mounts 205,305 of the present invention could be utilized in conjunction with axles and sleeves having varied wall thicknesses, different shapes, and being formed or constructed from different materials, without changing the overall concept or operation of the present invention. It is even further contemplated that preferred embodiment brake system component axle mounts 205,305 of the present invention could be formed utilizing a sleeve having a generally rectangular flat shape, with the sleeve being formed around the axle and the ends of the sleeve being mechanically locked to one another around the axle by interlocking tabs or other such mechanical locking means without changing the overall concept or operation of the present invention. It is yet even further contemplated that preferred embodiment brake system component axle mounts 205,305 of the present invention could be formed with pairs of sleeves 232,331 as shown in FIGS. 2C and 3C, or they could be formed with a single sleeve or multiple sleeves such as three, four or more sleeves, without changing the overall concept or operation of the present invention. It is also contemplated that preferred embodiment brake system component axle mounts 205,305 of the present invention could be utilized in conjunction with many types of air-ride rigid beam-type axle/suspension systems, including those using U-bolts, U-bolt brackets/axle seats and the like, without changing the overall concept or operation of the present invention. It is even further contemplated that preferred embodiment brake system component axle mounts 205,305 of the present invention could be utilized in connection with other types of axle/suspension systems, such as mid-lift, trailer four-spring or tandem axle/suspension systems or those that utilize leaf springs, without changing the overall concept or operation of the present invention. It is yet even further contemplated that depressions 286,288,386,388 formed in sleeves 231,331 and axles 207,307, respectively, could be circular shaped, elongated or oval shaped, could be circular shaped and paired together, or could be other shapes, sizes and arrangements including combinations of one or more of the examples set forth above, without changing the overall concept or operation of the present invention. It is also contemplated that mated pairs of depressions 286,288,386,388 formed in sleeves 231,331 and axles 207,307, respectively, could be formed one mated pair at a time, more than one mated pair at a time, or even all at once, without changing the overall concept or operation of the present invention. It is even further contemplated that sleeves 231,331 and axles 207,307 of preferred embodiment brake system component axle mounts 205,305 of the present invention could be simultaneously swaged and formed with depressions 286,288,386,388 without changing the overall concept or operation of the present invention.

Accordingly, the brake system component axle mount is simplified, provides an effective, safe, inexpensive and efficient structure and method which achieves all the enumerated objectives, provides for eliminating difficulties encountered with prior art brake system mounts, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the brake system component axle mount is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A brake system component axle mount for an axle/suspension system comprising:
    a) an axle formed with at least one depression;
    b) a sleeve formed with at least one depression, said at least one sleeve depression being formed in an exterior surface of the sleeve, said sleeve disposed about said axle, said at least one axle depression matingly engaging said at least one sleeve depression to form a mated pair of depressions for mechanically locking the sleeve to the axle wherein said at least one sleeve depression is plastically deformed and said at least one axle depression is plastically and elastically deformed when the sleeve is mechanically locked to the axle; and
    c) a mount assembly rigidly attached to said sleeve for mounting a brake assembly of the axle/suspension system.

2. The brake system component axle mount for an axle/suspension system of claim 1, wherein said mated pair of depressions exhibits a pre-load or compression between said sleeve depression and said axle depression.

3. The brake system component axle mount for an axle/suspension system of claim 1, wherein said at least one sleeve depression comprises eight sleeve depressions and said at least one axle depression comprises eight axle depressions, each one of said eight sleeve depressions matingly engaging a respective one of said eight axle depressions to form eight mated pairs of depressions.

4. The brake system component axle mount for an axle/suspension system of claim 3, wherein said eight mated pairs of depressions are spaced around said sleeve and said axle.

5. The brake system component axle mount for an axle/suspension system of claim 3, wherein said eight mated pairs of depressions are formed in rows of two spaced around said sleeve and said axle.

6. The brake system component axle mount for an axle/suspension system of claim 3, wherein said eight mated pairs of depressions are formed in offset rows of two spaced around said sleeve and said axle.

7. The brake system component axle mount for an axle/suspension system of claim 1, wherein said sleeve is swaged, squeezed or crimped onto said axle.

8. The brake system component axle mount for an axle/suspension system of claim 1, wherein said at least one sleeve depression and said at least one axle depression have a shape selected from the group consisting of circular and elongated.

9. The brake system component axle mount for an axle/suspension system of claim 1, wherein an adhesive is applied between said sleeve and said axle.

10. The brake system component axle mount for an axle/suspension system of claim 1, said mount assembly further comprising an integrally formed cam bracket and brake chamber bracket.

11. The brake system component axle mount for an axle/suspension system of claim 1, said mount assembly further comprising a cam bracket spaced apart from a brake chamber bracket.

* * * * *